United States Patent [19]

Langland

[11] Patent Number: 5,782,337
[45] Date of Patent: Jul. 21, 1998

[54] CONVEYOR BELT SYSTEM AND HEATER UTILIZING SAID SYSTEM

[75] Inventor: George Raymond Langland, Diamond Springs, Calif.

[73] Assignee: Raychem Corporation, Menlo Park, Calif.

[21] Appl. No.: 294,769

[22] Filed: Aug. 23, 1994

Related U.S. Application Data

[63] Continuation of Ser. No. 66,047, filed as PCT/US92/00163, Jan. 10, 1992 published as WO92/12918, Aug. 6, 1992, abandoned, which is a continuation-in-part of Ser. No. 641,374, Jan. 15, 1991, abandoned, and Ser. No. 341,416, Jan. 15, 1991, abandoned.

[51] Int. Cl.$^6$ ............................................. B65G 25/00
[52] U.S. Cl. ................................... 198/803.1; 198/803.8
[58] Field of Search ........................... 198/803.1, 803.3, 198/803.8, 803.13, 470.1

[56] References Cited

U.S. PATENT DOCUMENTS

| | | | |
|---|---|---|---|
| 1,615,194 | 1/1927 | Swab | 198/803.1 |
| 2,025,371 | 12/1935 | Beidler | 198/803.1 X |
| 2,956,520 | 10/1960 | Keller | 198/803.1 X |
| 3,115,964 | 12/1963 | Logan | 198/803.8 X |
| 3,269,524 | 8/1966 | Lanfield | 198/803.1 X |
| 3,394,931 | 7/1968 | Gavin | 198/803.1 X |
| 4,015,340 | 4/1977 | Treleven | 34/4 |
| 4,276,978 | 7/1981 | Deguchi et al. | 198/803.1 |
| 4,434,562 | 3/1984 | Bubley et al. | 34/4 |
| 4,502,586 | 3/1985 | Dusel et al. | 198/345 |
| 4,516,675 | 5/1985 | Koskovich | 198/803.1 |
| 4,521,946 | 6/1985 | Dusel et al. | 29/33 |
| 4,574,182 | 3/1986 | Pescatore et al. | 219/388 |
| 4,654,227 | 3/1987 | Cornellier | 198/803.1 X |
| 4,764,662 | 8/1988 | Andersen et al. | 219/391 |
| 4,779,717 | 10/1988 | Eberle | 198/803.8 |
| 4,894,517 | 1/1990 | Oguri | 219/388 |

OTHER PUBLICATIONS

IBM Technical Disclosure Bulletin vol. 32, No. 5B, Oct. 1989, pp. 73–74 as cited in the European Search Report for European Application No. 92904427.9.
Raychem, "Model 16" Publication.
Raychem "IR-1038/IR-1046/IR-1146 Process Belt Heaters for Heatshrinkable Tubings and Terminating Devices" Publication.
Raychem "Operating and Maintenence Manual for IR-1038, IR-1046 Mark II, IR-1146" publication.

*Primary Examiner*—James R. Bidwell
*Attorney, Agent, or Firm*—Herbert G. Burkard; Sheri M. Novack

[57] ABSTRACT

One aspect of this invention comprises an improved conveyance system comprises an endless flexible belt which circulates through at least two arcs, at least one gripping member attached to the belt, the gripping member having a free end and an anchoring end, and a biasing means which biases the anchoring end of the gripping member toward the surface of the conveyor belt, wherein the gripping member is open as it traverses an arced path and is closed as it traverses a straight path. A workpiece is loaded as the gripping member traverses the first arc, and offloaded as the gripping member traverses the second arc. Preferably, the first arc has a greater radius than the second arc. The inventive also comprises a heater utilizing the conveyance system.

3 Claims, 8 Drawing Sheets

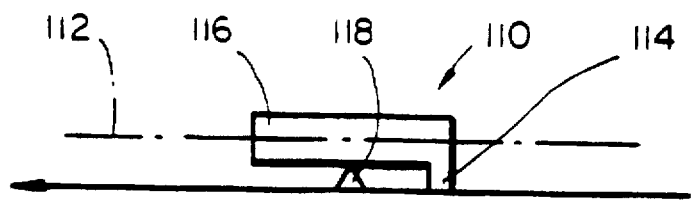
FIG_1a
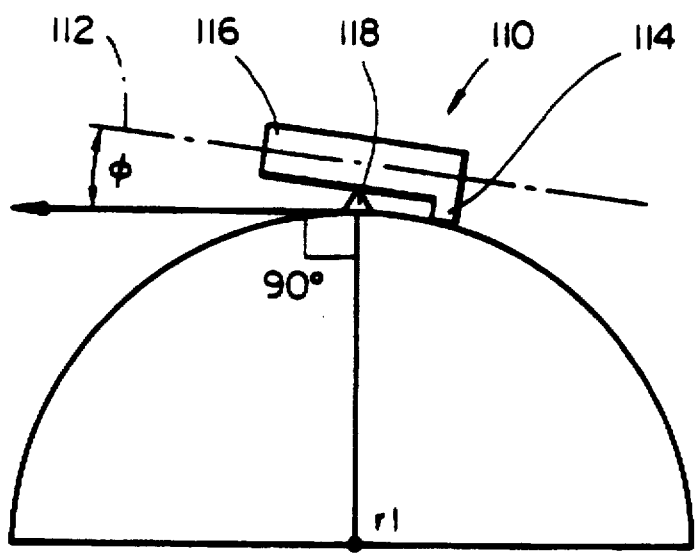
FIG_1b
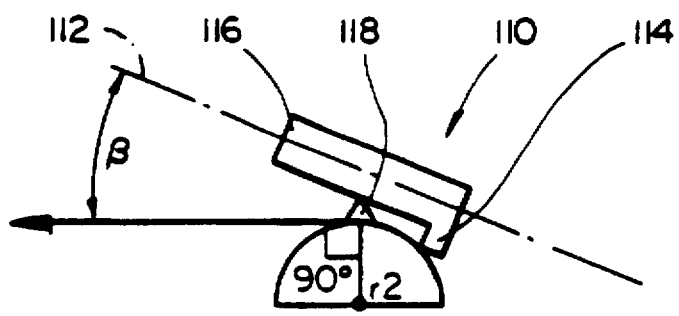
FIG_1c

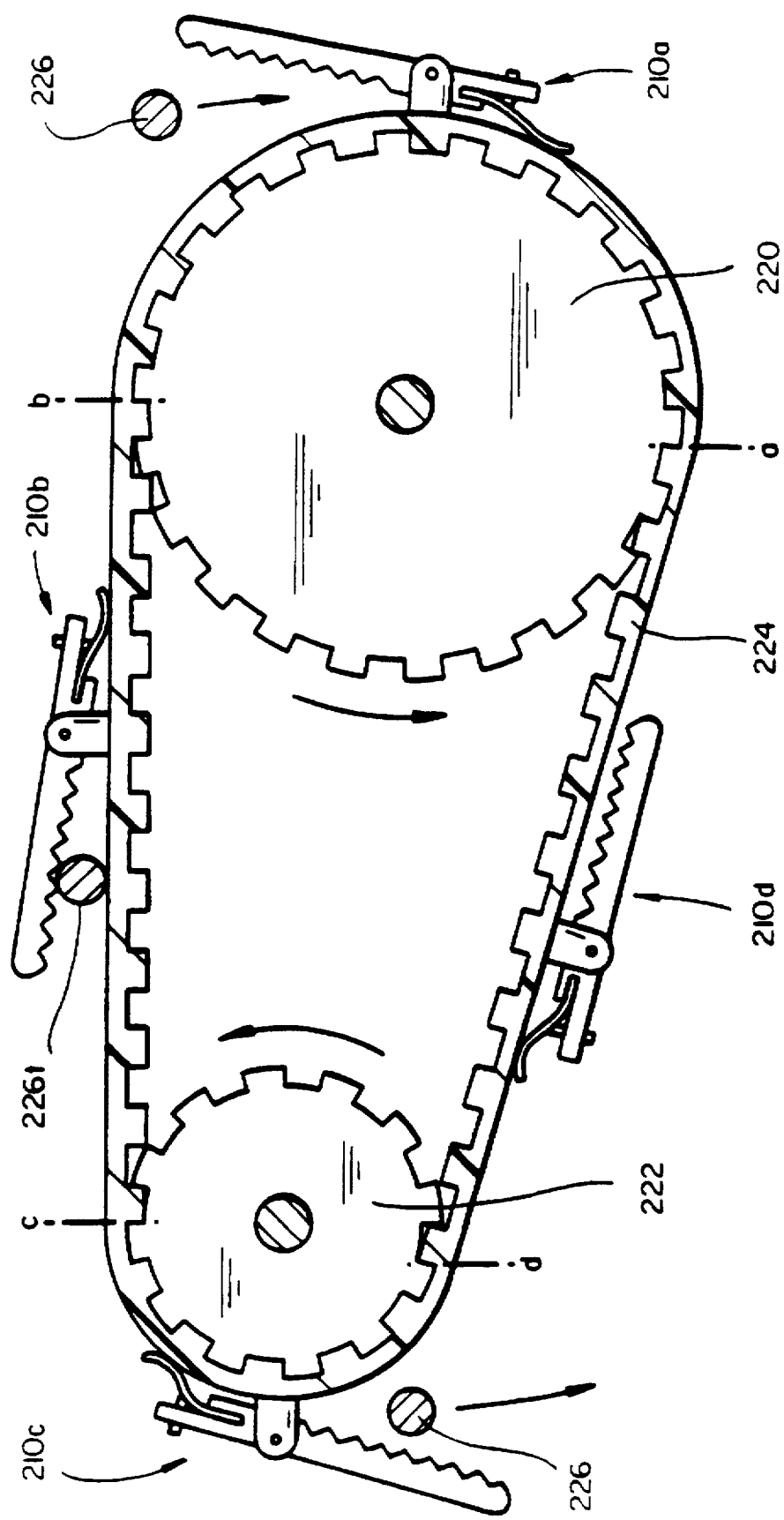
FIG_2

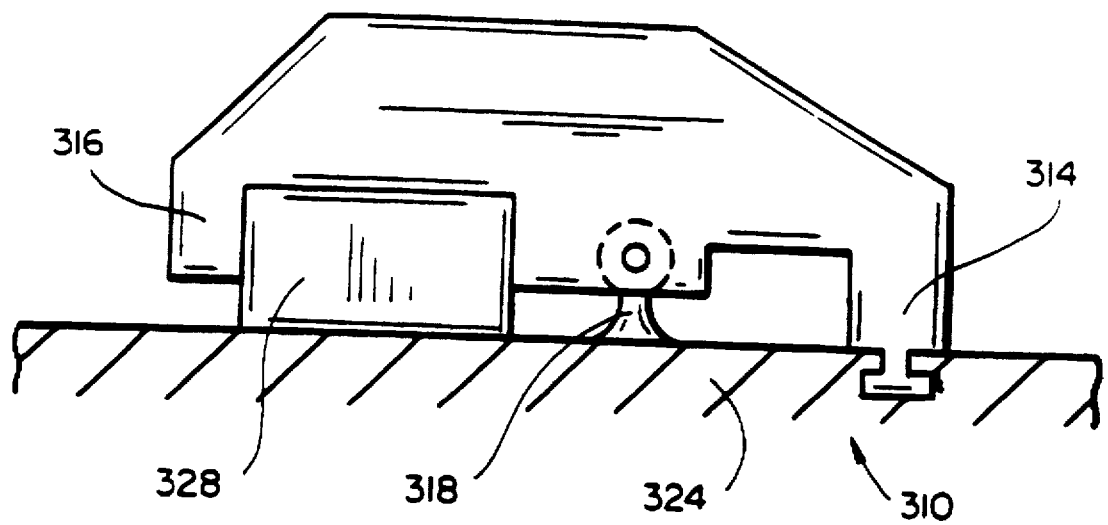
FIG_3a
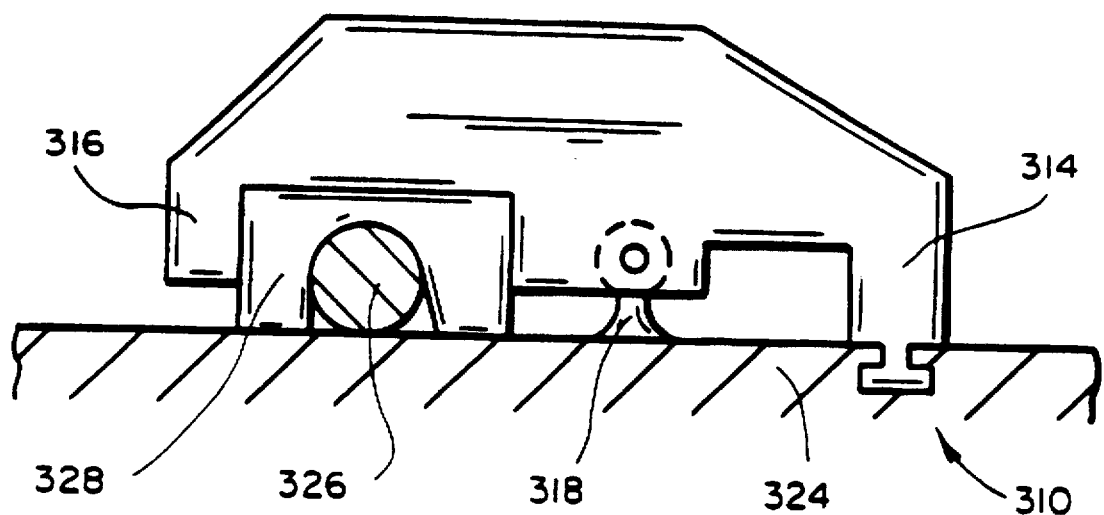
FIG_3b

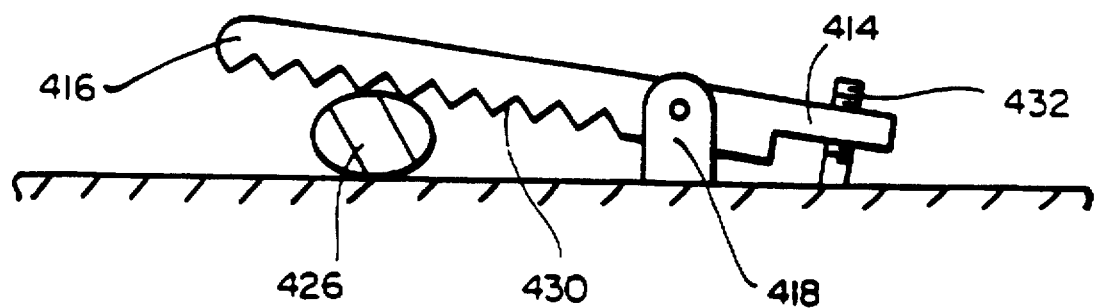
FIG_4
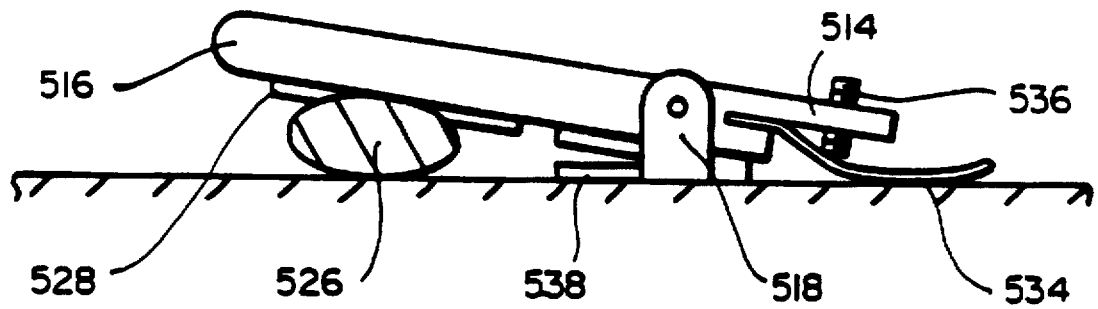
FIG_5
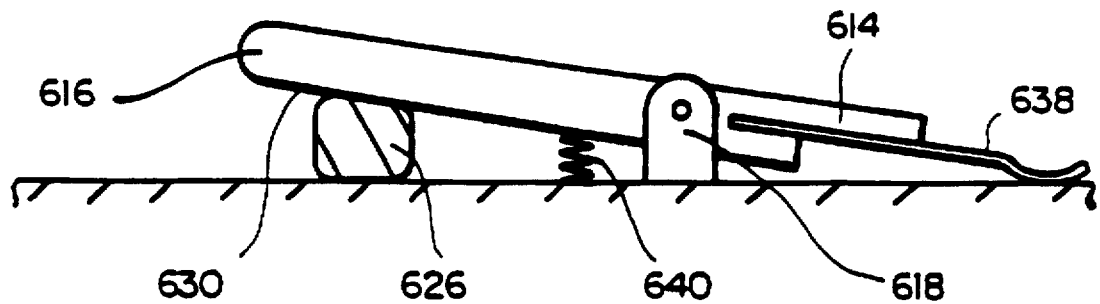
FIG_6

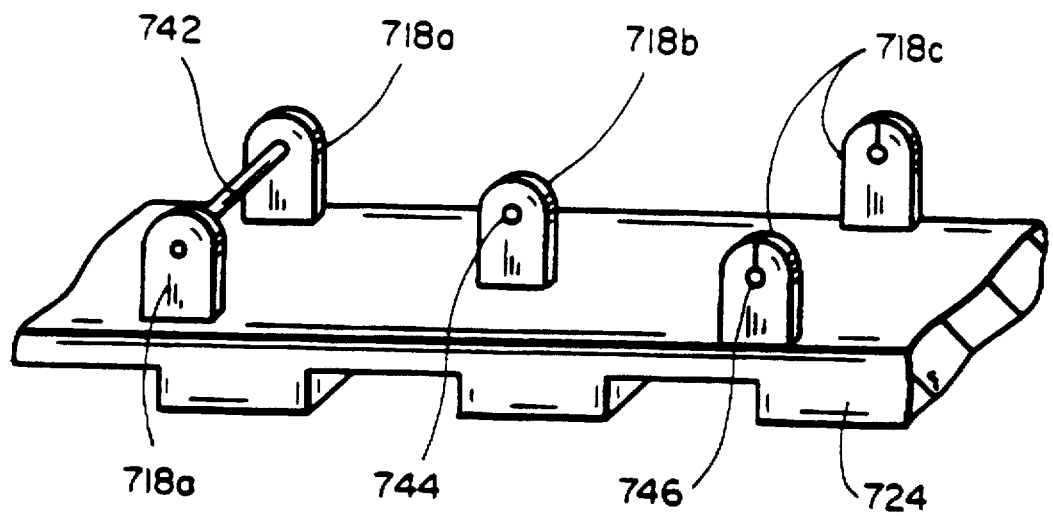
FIG_7
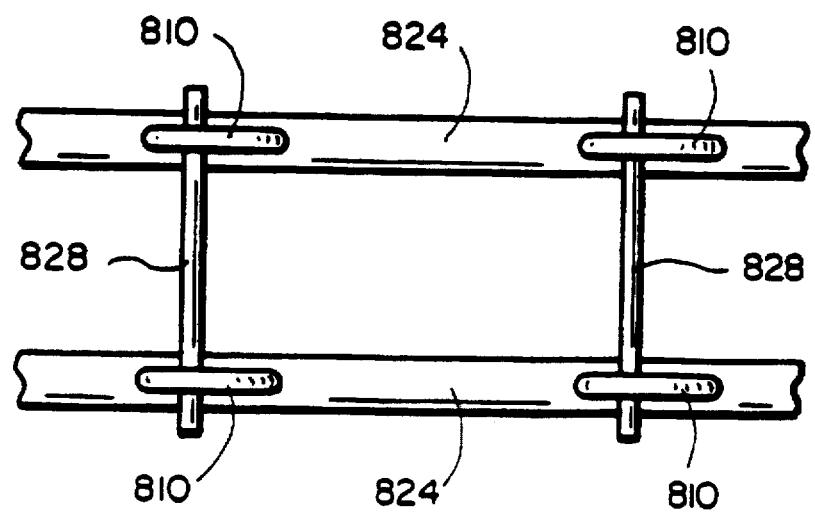
FIG_8

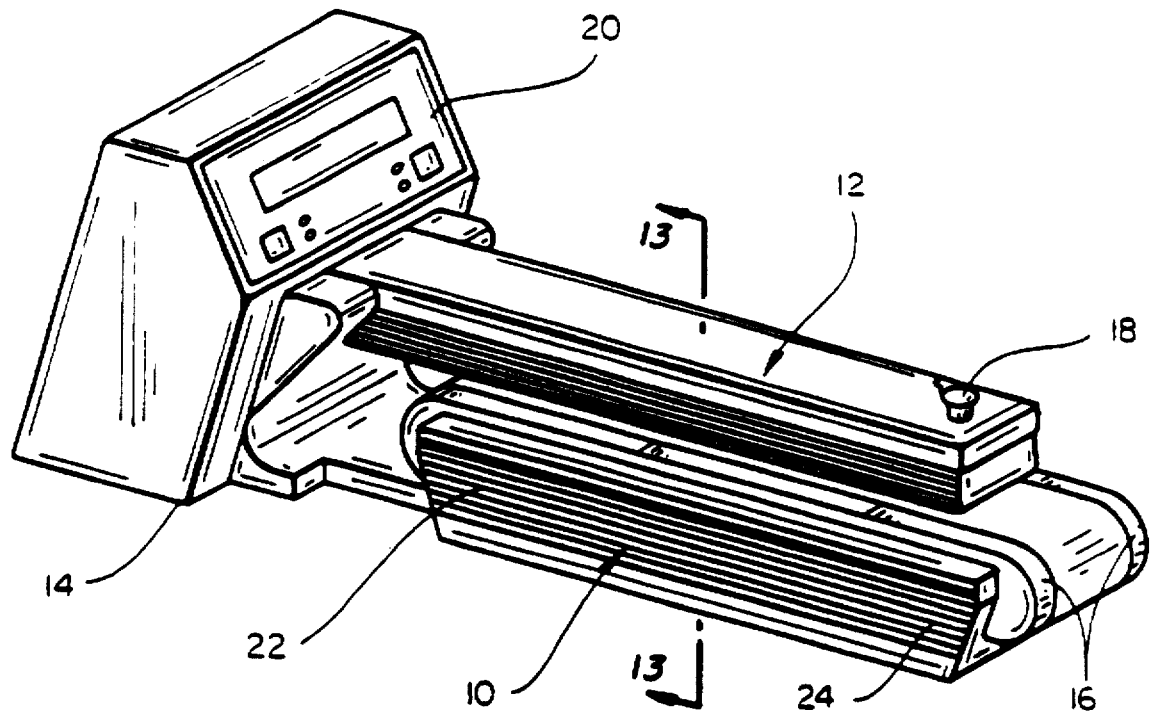
FIG_11
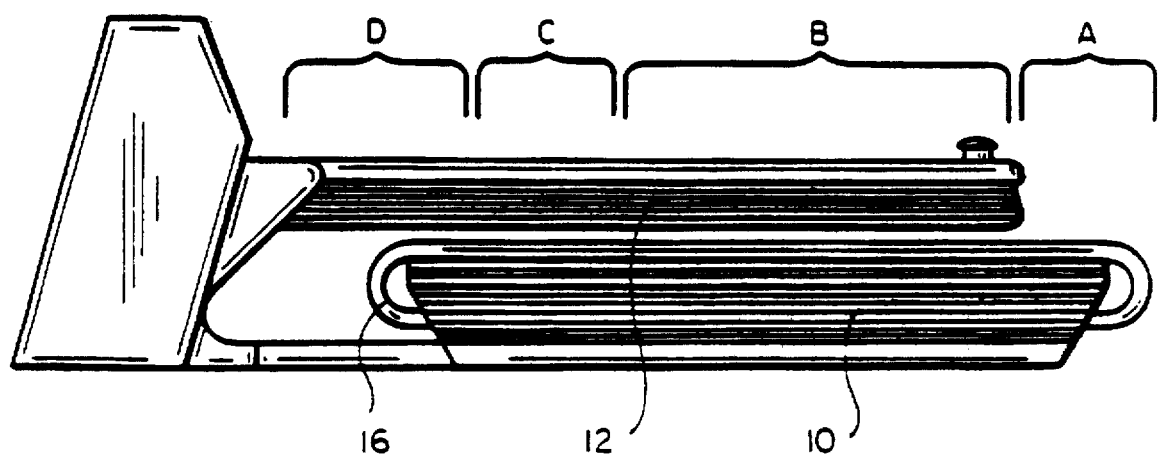
FIG_12

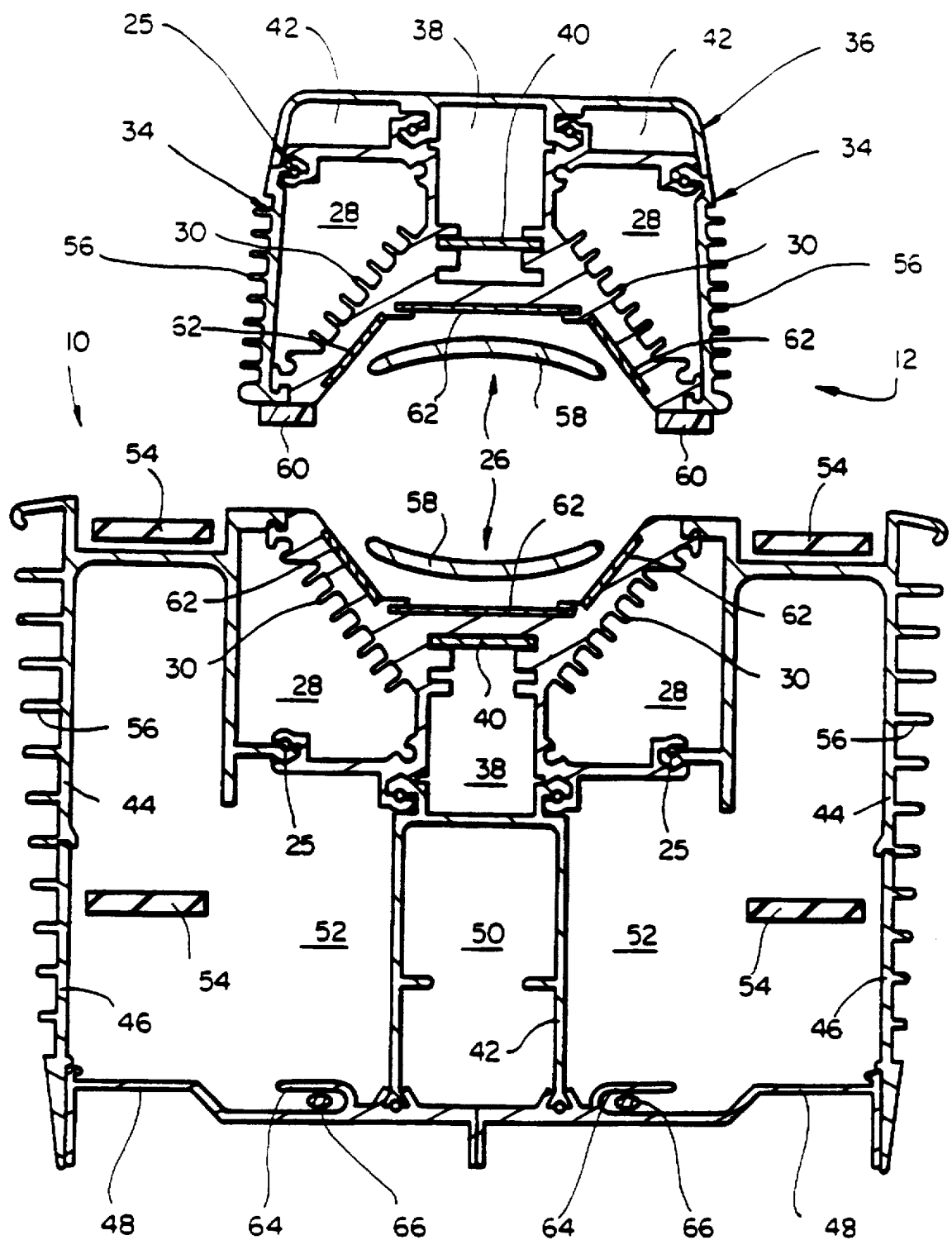
FIG_13

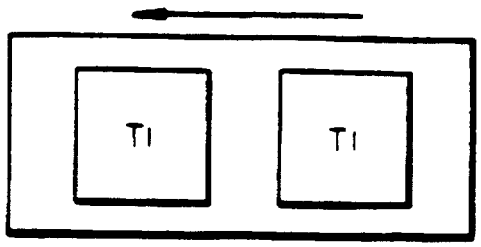
FIG_14a
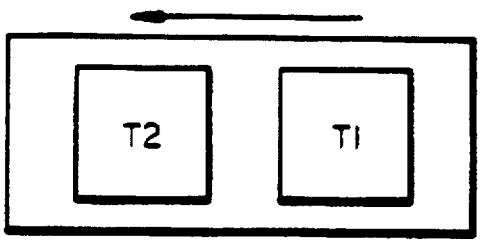
FIG_14b
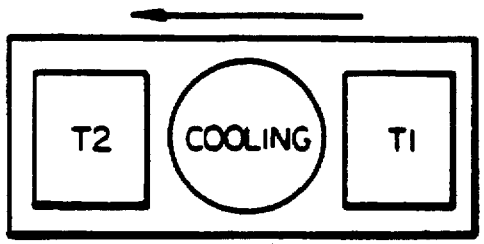
FIG_14c
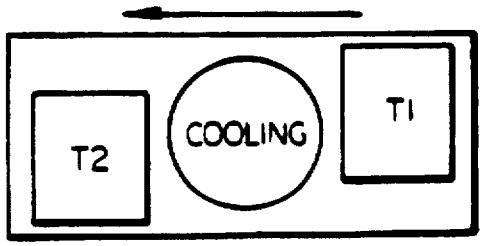
FIG_14d

5,782,337

CONVEYOR BELT SYSTEM AND HEATER UTILIZING SAID SYSTEM

CROSS-REFERENCE TO RELATED APPLICATIONS

This application is a continuation of application Ser. No. 08/066,047, now abandoned, filed May 25, 1993, which is the national phase application of PCT/US92/00163, Jan. 10, 1992, published as WO92/12918, Aug. 6, 1992, which is a continuation in part of application Ser. Nos. 07/641,416 filed Jan. 15, 1991 and 07/641,374 filed Jan. 15, 1991, both abandoned.

This invention relates to devices which transport a workpiece. More particularly, this invention relates conveyor belts, and gripping members for use in conjunction with a conveyor belt. The invention finds particular use in the conveyance of wire segments, tubing, pipe, and the like, as the workpiece. In particular, the invention finds use in surveying the workpiece through a heater.

A variety of industrial applications require the transport of a workpiece from one station to another. Various conveyor systems have been designed to accommodate different types and sizes of workpieces. For example, large boxes are often transported on a roller-type conveyor, which consists of independent cylinders capable of rotation around an axis.

Conveyor systems can be powered, or can rely on gravity to move the workpieces from one location to another. The workpieces can be free-floating along the conveyor, they can be contained within a "boat", or they can be cradled or gripped for transport.

Many industrial products using electrical wire leads take the form of cut segments of insulated wire, usually stripped at one or both ends, which are then tinned or provided with terminals at one or both of the stripped ends. The wire segments used in such leads can be manufactured on a high speed lineal feed cutting and stripping machine, which cuts the segments from a continuous strand of wire moving along a path. Cutting and stripping usually occur simultaneously. In some cases, the segments are discharged into a collection container. In other cases, the cut and stripped wire segments are individually seized and transported by a conveyor from the cutting and stripping machine to other wire processing machines which perform operations such as tinning, twisting, terminal attachment and so forth.

The transport of elongated workpieces having a round, oval, or eccentric cross-section has found only a limited solution in the prior art. Some prior art conveyors employ an endless chain reeved around longitudinally spaced apart sprockets and the chain is provided at intervals therealong with wire gripping devices or jaws which open and close automatically at appropriate intervals to grip and then subsequently release the wire segments to be conveyed. Relatively complex mechanisms are required to operate the jaws. Such prior art conveyors present certain problems. For example, moving metal parts in the chain, jaws and operating mechanisms are subject to wear and mechanical breakdown. Further, the mass and operational characteristics of the chain and associated components impose upper limits on conveyor speed.

U.S. Pat. Nos. 4,502,586 and 4,521,946 disclose a cutting mechanism and transport system for wire.

It would be desirable to provide a conveyor belt system which is easily adapted to a variety of workpieces, has enhanced loading and offloading properties, and is suitable for use in an automatic, semi-automatic, or on-demand delivery system. It would also be desirable to provide a conveyance system which does not require an opposed flexible belt for the transport of elongated workpieces, such as, for example, tubing. One method for heating tubing uses the heating apparatus described in U.S. Pat. No. 3,515,853, wherein a heating device includes two aligned semi-cylindrical sides which, when closed, form a cylindrical structure that encircles the tubing to be heated. Each side has a plurality of filaments which provide the heat.

A conveyor belt heater, a "toaster" like heater, and corresponding methods of heating the tubing are described in U.S. Pat. No. 4,764,662. The device of U.S. Pat. No. 4,764,662 processes one splice per cycle, and provides for "pulsing" the heater to control oven temperature.

Raychem models IR-1038 and IR-1046 Process Heaters use a pair of endless flexible belts, one supported above the other, to transport a wire workpiece gripped between the belts. Raychem Models 16A and 47 Shrink-Tube Processors include similar transport systems. These devices are cooled using internal fans. Cooling air currents waft across the heating element in order to maintain the temperature within critical ranges. This cooling method has functioned adequately for low-powered heating elements (e.g., when the heating element is less than about 500 watts).

When higher-powered heating elements are used (e.g., when each heater element is greater than about 500 watts), the known methods of cooling either permit undue heat buildup, or pass such a quantity of cooling air over the heating elements and across the workpiece being heated, that the quality of the product may be adversely affected.

One aspect of this invention comprises an improved conveyance system comprises an endless flexible belt which circulates through at least two arcs, at least one gripping member attached to the belt, the gripping member having a free end and an anchoring end, and a biasing means which biases an anchoring end of the gripping member toward the surface of the conveyor belt, wherein the gripping member is open as it traverses an arced path and is closed as it traverses a straight path. A workpiece is loaded as the gripping member traverses the first arc, and offloaded as the gripping member traverses the second arc. Preferably, the first arc has a greater radius than the second arc.

The gripping member comprises a lever having a medial pivot point and a biasing means which biases one end of the lever toward the conveyor belt. More specifically, the gripping member comprises a lever having a) an anchoring end which is held proximate to the conveyor belt; b) a free end opposite the attached end, the free end having at least one surface adapted to grip a workpiece, and c) a pivot means located between the anchoring end and the free end. The gripping means is optionally biased to maintain the free end toward the surface of the belt as the gripping member traverses a straight path, or to maintain the free end away from the surface of the belt as the gripping member traverses an arced path.

Another aspect of this invention comprises an improved endless loop conveyor belt having pivotal attachments is also disclosed. The improved conveyor belt finds particular use in the subject conveyor system.

A further aspect of this invention comprises a method for conveying a workpiece comprises a) conveying a gripping member in a path which describes a first arc having a predetermined radius, said gripping member being open as it traverses the arc; b) loading a workpiece into the opening present as the gripping member traverses the first arc; c) conveying the gripping member and workpiece in a path which is substantially straight, said gripping member being closed and firmly holding the workpiece as it traverses the substantially straight path; and d) conveying the gripping member in a path which describes a second arc having a predetermined radius, said gripping member being open as it traverses the second arc to permit the exit of the workpiece.

Yet a further aspect of this invention comprises a method for heating a workpiece comprises a) conveying a gripping member in a path which describes a first arc having a predetermined radius, said gripping member being open as it traverses the arc; b) loading a workpiece into the opening present as the gripping member traverses the first arc; c) conveying the gripping member and workpiece in a path which is substantially straight, said gripping member being closed and firmly holding the workpiece as it traverses the substantially straight path; d) heating the workpiece as it traverses a substantially straight path; and e) conveying the gripping member in a path which describes a second arc having a predetermined radius, said gripping member being open as it traverses the second arc to permit the exit of the workpiece.

A still further aspect of this invention comprises a heater device comprising an elongate housing including a surface heating trough and conveyance system described above, which conveyance system preferably (disk already connected) ncludes at least one gripping member, as described above.

FIG. 1 shows a gripping member of this invention as it appears on three surfaces: (a) a level surface, (b) an arc having a relatively large radius, and (c) an arc having a relatively small radius.

FIG. 2 shows a conveyor system having gripping members in the loading, gripping, offloading, and transit stage.

FIG. 3 shows a preferred gripping member with and without a gripped workpiece.

FIGS. 4, 5 and 6 show alternate gripping members.

FIG. 7 is a detail drawing of a conveyor belt having pivot attachments.

FIG. 8 is an overhead drawing of a conveyor belt and gripping members transporting wire bundle workpieces.

A conveyance system is disclosed. The system comprises an endless flexible belt, e.g., a conveyor belt. Attached to the flexible belt is one or more gripping member. As the gripping member traverses the path described by the flexible belt it is opened and closed. This opening and closure is due to the conformational geometry of the system, and does not require any additional controls or moving parts. FIGS. 1 and 2 show the geometry involved.

A variety of specific configurations for gripping members are shown in FIGS. 3 through 6. Each gripping member is characterized as comprising a pivotable lever, the pivot point being located between a free end and an anchoring end. The anchoring end can be attached to the substrate in order to maintain the gripping member in the closed position on a level surface, such as in FIG. 3. Alteratively it can be biased to maintain the gripping member in the closed position on a level surface, as shown in FIGS. 4 through 6. Additionally, the free end can be biased for maximal aperture opening during loading and offloading of a workpiece, such as shown in FIGS. 5 and 6. The gripping member preferably has a gripping pad (FIGS. 3 and 5) or gripping area (FIGS. 4 and 6) to assist the firm capture of a workpiece.

The gripping member is attached through the pivotal connection to the flexible belt. The pivotal connection can be any connection which permits movement across the axis of the gripping member. The pivotal connection can be, for example, a pin-and-aperature, a universal joint, a ball-and-socket joint, and the like. Preferably the pivotal connection permits free movement along the length of the gripping member but limits movement across the width of the gripping member.

The flexible belt is preferably an endless flexible belt. For example, the substrate can be a loop of rubber or plastic, a loop of interlocking links, and the like. The substrate can be formed in one piece, or it can be formed in smaller units which are joined to form the loop. Then flexible belt is preferably joined for ease of removal or replacement. The flexible belt can be narrower or wider than the gripping member, and is preferably wider.

The flexible belt circulates about two or more pulleys. The pulleys can have a smooth outer surface. Preferably, the pulleys include gearing which interlocks with the flexible belt, such as illustrated in FIG. 2. Preferably, when two or more pulleys are present at least one of the pulleys is powered to cause rotation of the flexible belt around the pulleys.

Similar numbers refer to similar function throughout the Figures. The Figures are drawn for clarity and are not drawn to scale.

As shown in FIG. 1(a), as the gripping member 110 is carried along a straight or level path by the flexible belt, the axis 112 of the gripping member 110 stays generally parallel to the direction of motion (arrow). The gripping member 110 is in a "closed" configuration. The gripping member 110 is characterized as having an anchoring end 114, a free end 116, and a pivotal connection 118, located between the anchoring end 114 and the free end 116.

As used herein, a "straight" path is a path which is generally straight or which is concave. As a gripping member traverses a straight path, the gripping member is a closed configuration. As used herein, an "arced" path is a path which is generally convex. A gripping member which traverses such a path is in an open configuration.

When the gripping member 110 traverses a curving path having a relatively large radius, such as shown in FIG. 1(b), the axis of the gripping member is no longer parallel to the direction of motion (arrow). Rather, the anchoring end 114 of the gripping member 110 remains at or near the surface of the path. The free end 116 of the gripping member 110 is removed from the surface of the path, and the gripping member is in an "open" configuration. The angle $\phi$ describes the angle between the direction of motion (arrow) and the axis 112 of the gripping member 110. When the radius $r_1$ is relatively great, the angle $\phi$ is relatively small.

When the gripping member 110 traverses an curving path having a relatively small radius, such as shown in FIG. 1(c), the axis of the gripping member is further displaced from the direction of motion (arrow). The anchoring end 114 of the gripping member 110 remains at or near the surface of the path. The pivotal connection 118 pivotally connects the gripping member to a conveyor belt (not shown). The free end 116 of the gripping member 110 is greatly removed from the surface of the path, and the gripping member is in an "open" configuration. The angle $\beta$ describes the angle between the direction of motion (arrow) and the axis 112 of the gripping member 110. When the radius $r_2$ is relatively small, the angle $\beta$ is relatively great.

FIG. 2 shows a conveyance system including a large pulley 220, a small pulley 222, and an endless flexible belt 224, such as a conveyor belt. Two geared pulleys and one interlocking conveyor belt are illustrated for simplicity of illustration, but it will be easily seen that alternate configurations are possible. A conveyor system of this invention could have, for example, smooth pulleys to which an endless flexible belt is attached by friction. Parallel pulleys and/or endless belts are possible. For example, two or more parallel endless belts and gripping members can be use to transport a workpiece through a manufacturing step. Three or more pulleys can be used in conjunction with one endless belt. One or more of the pulleys is generally powered for rotation, but that is not required. The endless belt can be rotated by, for example, a force applied to its outer surface. Methods for causing motion of an endless flexible belt are well known in the art. Preferably, the endless belt is moved by the rotational force of one or more pulley at its inner surface.

Four gripping members are shown in FIG. 2. The specific gripping member embodiment illustrated is shown in more detail in FIG. 5. As illustrated, each of the gripping members is in an alternate configuration.

Gripping member 210a is shown on a curving path having a relatively large radius. This is a preferred configuration for loading workpieces. The gripping member 210a opens sufficiently for the workpiece to be inserted. A workpiece 226 can be loaded manually, or is loaded automatically.

The workpiece 226 is shown having a circular cross-section. It will be apparent that this is for purposes of illustration only, and the workpiece can have any dimensions which can be gripped and transported by a conveyor system of this invention. The workpiece can comprise, for example, wires or bundles of wires, through a heating device. Alternatively, the workpiece can comprise a plate, packet, or other article.

As illustrated, the gripping member then continues to a straight section of endless belt, as shown by gripping member 210b. The workpiece 226t is held for transport. It is generally during this transport that one or more manufacturing steps takes place upon on the workpiece, if desired. For example, wires bundles which have been coated with a heat-shrinkable covering are loaded into a conveyance device of this invention, transported through a heating device where the heat-shrinkable covering is shrunk to provide an environmental seal, and the wire bundles are cooled and offloaded.

Gripping member 210b is in a closed configuration which is suitable for transporting a workpiece. The gripping member 210b is shown on a straight path, such as that of FIG. 1(a). The gripping member 210b holds the workpiece 226t firmly, so that no slippage occurs. Any manufacturing processes which are to be performed upon the workpiece preferably take place when the workpiece is being firmly held, such as in this configuration.

Gripping member 210c is shown on a curving path having a relatively small radius. This is a preferred configuration for offloading workpieces, the wider opening aperture found in gripping member 210c as contrasted to gripping member 210a assists in the automatic removal of the workpiece without inadvertent hang-up on the apparatus. In some applications, however, it may be desirable to have a workpiece offloaded as it traverses an arc which has a radius equal to or greater than the radius of the arc on which the workpiece was loaded.

The open gripping members 210a and 210c are shown midway around the circumference of the large pulley 220, but it will be easily seen that a gripping member will be in an open configuration when both the anchoring end 214 and the pivotal connection 218 are between points a and b on the large pulley 220, or between points c and d on the small pulley 222. As the gripping members pass across points a, b, c or d they are in transition between the open position and the closed position.

Gripping member 210d is shown in a closed configuration, without a gripped workpiece.

It will be readily understood that the number and placement of gripping members of this invention will vary with the conveyor system and its specific application. In general, the smaller the workpiece which is to be transported, the smaller and more numerous the gripping members can be.

FIG. 3a illustrates a gripping member 310 in the closed position when no workpiece is present. The gripping member 310 includes an anchoring end 314, which is fixed to a flexible belt 324. At the opposite end of the gripping member 310 is a free end 316. Between the anchoring end 314 and free end 316 is a pivotal connection 318. The pivotal connection 318 permits the gripping mechanism to open fully as it traverses an arced path. A gripping pad 328 can be provided to ensure sufficient friction to hold a workpiece firmly.

The gripping member 310 can be made of any material or materials exhibiting structural rigidity. Conveniently the gripping member 310 is made of plastic. For certain applications, a ceramic or metallic material may be desired for all or part of the body of the gripping member 310.

The gripping pad 328 can comprise a soft plastic pad, a rubber pad, a foam pad, or the like. It can have any desired shape. The gripping pad 328 can be embedded in the gripping member 310, as shown, or it can be affixed to the surface of the gripping member 310 between the free end 316 and the pivotal connection 318. The gripping pad 328 can be glued or otherwise affixed in position.

FIG. 3b illustrates a gripping member 310 in the closed position when a workpiece 326 is present. The workpiece 326 is held firmly in place by the gripping member 310.

FIG. 4 illustrates one embodiment of a gripping member of this invention. A workpiece 426 is shown at the gripping surface 430 of the free end 416. The workpiece 426 is in position for transport. The gripping member is biased in the closed position by the action of a spring-loaded pin 432, such as a vlier pin.

FIG. 5 illustrates an alternate embodiment of a gripping member of this invention. A gripping pad 528 hold the workpiece 526 firmly. The gripping member is biased in the closed position by the interaction of a leaf spring 534, and a set screw 536.

The gripping member includes a U-shaped or V-shaped spring 538 on the underside of the gripping member. This spring acts to bias the gripping member in open position as it traverses an arced path.

FIG. 6 shows another embodiment of a gripping member of this invention. A workpiece 626 is shown at the gripping surface 630 of the free end 616. The gripping member is biased in the closed position by the action of a leaf spring 638. The gripping member also includes a spring 640 on the underside of the gripping member. This spring 640 acts to bias the gripping member in a fully open position as it traverses an arced path.

FIG. 7 shows an endless flexible belt 724 of this invention. The flexible belt 724 includes at least one pivot attachment on the surface of the flexible belt. The pivot attachment is used to pivotally secure a gripping member to the surface of the belt. Generally, the flexible belt 724 will comprise at least one pair of pivot attachments. The endless flexible belt of this invention has the advantage of permitting the easy attachment and removal of gripping members. Thus, a machine which includes a conveyance system of this invention can be easily modified to permit the transport of workpieces having diverse sizes or shapes. The gripping members on a flexible belt used to transport a specific workpiece can be removed, and replaced with a set of gripping members which are adapted to transport an alternate workpiece.

Three alternate pivotal connections are shown in FIG. 7. It is to be understood that this is for illustrative purposes, and that, for ease of use, all the pivotal connections on a flexible belt will preferably have a similar configuration.

Pivotal connection 718a is a pin-and-aperature pivotal connection. The gripping member (not shown) provides an aperture which engages the pin 742, and permits longitudinal motion of the gripping member.

Pivotal connection 718b is an alternate pin-and-aperature pivotal connection. The gripping member (not shown) provides a pin which engages the aperture 744, and permits longitudinal motion of the gripping member.

Pivotal connection 718c is an pin-and-aperature pivotal connection in which the gripping member (not shown) provides a pin which snaps into the aperture 746.

While pin-and-aperature pivotal connections have been illustrated, it will be clear to those skilled in the art that other pivotal connections are also suitable for use as a component of the flexible belt of this invention.

FIG. 8 is an overhead illustration of two parallel flexible belts 824 and parallel gripping members 810 transporting wire bundle workpieces 826 along a straight path. Such a parallel belt system is useful when the workpieces to be transported are elongated, such as when the workpieces comprise wire bundles, piping, tubes, and the like.

The subject invention includes a method for conveying a workpiece, the method comprising: a) conveying a gripping member in a path which describes a first arc having a predetermined radius, said gripping member opening as it traverses the arc; b) loading a workpiece into the opening formed as the gripping member traverses the first arc; c) conveying the gripping member and workpiece in a path which is substantially straight, said gripping member closing and firmly holding the workpiece as it traverses the substantially straight path; and d) conveying the gripping member in a path which describes a second arc having a predetermined radius, said gripping member opening as it traverses the second arc to permit the exit of the workpiece.

In a preferred method, a heat-shrinkable outer layer surrounds a workpiece. The workpiece is then transported through a heating zone, and the heat-shrinkable outer layer is shrunk in position. This method comprises: a) conveying a gripping member in a path which describes a first arc having a predetermined radius, said gripping member opening as it traverses the arc; b) loading a workpiece into the opening formed as the gripping member traverses the first arc; c) conveying the gripping member and workpiece in a path which is substantially straight, said gripping member closing and firmly holding the workpiece as it traverses the substantially straight path; d) heating the workpiece as it traverses a substantially straight path; and e) conveying the gripping member in a path which describes a second arc having a predetermined radius, said gripping member opening as it traverses the second arc to permit the exit of the workpiece.

A preferred heater for performing this method is shown in:

FIG. 11 which is a heating device of this invention.

FIG. 12 which is a side view schematic of the device of FIG. 11.

FIG. 13 which is a cross-sectional views of a sheath of this invention, the cross section being taken along line 13—13 of FIG. 11.

FIG. 14 which shows alternate heating patterns which can be used in a device of this invention.

Comprises an elongate housing including a surface heating trough and at least one internal cooling chamber; and a means for temperature control. The elongate housing is generally an aluminum housing, and is preferably composed of multiple interlocking extruded aluminum components.

Included within the housing can be a heat sink on one or more surface, especially on a surface within an internal cooling chamber. Also included within the housing can be longitudinal chambers or slots for insulation, reflective material, air pockets, and the like. A fan or blower is preferably present to move air through the internal cooling chamber. An opposing heater can be present as part of the device.

Generally, the heater device will also include a conveyor means, which transports articles along the length of the machine as they are heated and/or cooled. The heater device is versatile and can find use with a variety of workpieces. The heater device is especially adapted for the heat shrink processing of automotive harnessing applications.

FIG. 11 shows an external view of a preferred device of this invention. Included within the device is a lower unit 10, an upper unit 12, and a base unit 14. It is to be understood that the terms "upper" and "lower" are for convenience of reference only, and that the units can have any desired spatial relationship. A conveyor system 16 traverses the lower unit 10. Located within each of the lower unit 10 and upper unit 12 is a heating area (not shown) and at least one internal cooling chamber (not shown). The base unit 14 houses the controls used for On/Off control, temperature control, and conveyor belt control. Other systems which may be present include, for example, jamming sensors, thermocouple control, circuit breakers, ground fault detectors, material movement sensors, temperature sensors. Display readouts can be included for temperature, over/under temperature alarms, probe temperature, power on light, heating element power lights, open thermocouple indicator, and the like. Counters, hour meters, and audio alarms can be present. Such systems, displays, and equipment are well known in the art. An emergency Off switch 18 is present on the upper unit 12.

A heater device without a conveyor system can be made. In such a device, a workpiece is manually delivered to one end of the heater device, moved past the heater element, and is then removed from the device. Preferably a conveyor system is present. The workpiece is loaded manually, semi-automatically or automatically into the conveyor system, is automatically carried by the conveyor system past the heater element, and is manually or automatically removed from the device.

For purposes of example only, the heater device will be described hereinafter with two heating elements in each of the lower unit 10 and upper unit 12. It will be understood that this is for purposes of clarity only. It is an advantage of the subject invention that the length of the lower unit 10 and upper unit 12 can be varied as desired. The use of extruded aluminum allows the easy design of a heater device having multiple heating and/or cooling areas. The temperature range of each heating and/or cooling area can be separately controlled. One, two, or multiple heating or cooling areas can be present. Heating and/or cooling areas can be partitioned across the length of the heater device, or they can be partitioned along the width of the device. For example, a workpiece which has different temperature requirements along each heated edge can be heat-treated by a device of this invention. Some alternate heating patterns are shown in FIG. 14. For purposes of illustration, a device having two heating elements across each of the lower unit 10 and upper unit 12 will be described. The heating pattern of configuration is shown in FIG. 14a.

The heater temperature and conveyor speed are set using a control panel 20. The pictured control panel 20 has controls for two sets of two heating elements: a "Front" heater, which includes an upper and a lower heating element, and a "Back" heater, which includes an upper and a lower heating element. The "Front" heater is that heater in which a workpiece is first heated.

The temperature setting will be determined by the type and size parameters of the workpiece to be heated, and the length of time the workpiece will be in contact with the heat. In a heater device such as that pictured, when the workpiece to be heated is a heat-shrink-coated automotive cable assembly, temperatures in the range of less than about 90° C. to greater than about 350° C., more usually 100° C. to 200° C. are used.

In a preferred embodiment, temperature sensors (not shown) are present within the body of the heater device. These sensors relay the temperature at a given point, and permit fine-tuning of the temperature controls.

The control panel 20 has controls for conveyor speed if a conveyor is present. The speed of the conveyor system will depend upon the type of workpiece, the desired heating temperature, and the loading efficiencies of the manual or automatic loading system.

Desired parameters for the temperature(s) of the heating area(s) and for the conveyor speed can be entered by adjusting the knobs and/or switches on the control panel. However, in a preferred embodiment, the control panel is not adjusted manually. Instead, a bar-code scanner is present. Bar-code arrays and scanners are known and used in other arts for a variety of purposes, including inventory control and grocery check-out. In a preferred embodiment of the subject invention, a batch of workpieces is tagged or marked with a predetermined bar-code array. When the bar-code is "read" by the scanner in a heater device of this invention, temperature, conveyor speed, and cooling zones are automatically set in compliance with the directions encoded.

As shown in FIG. 11, the lower unit 10 includes a conveyor system 16. Also housed within the lower unit 10 is a motor and gears (not shown) to drive the conveyor system. The conveyor system can be driven, for example by a DC motor. Preferably, one or more fans (not shown) is present to aid in cooling the heater device. Generally, a fan is a device which pushes air, while a blower pulls air. As used herein, the term "fan" refers to both fans and blowers. One or more fan will generally be needed when the power of the heating elements is 500 watts or greater. Fan size and output will vary with the specific embodiment and heating elements used in a heater device.

The size parameters of the device are not critical. However, the heater device shown, with two sets of two 1,000 watt heating elements, can conveniently be made to have a length of 52 inches, a height of 18 inches, and a width of 16 inches. The weight of such a device having an extruded aluminum housing is approximately 110 lbs.

When an opposing heater device is present, as shown, the upper (opposing) unit 12 will generally include one or more heating element arranged to correspond to the heating element(s) of the lower unit 10. However, it may be desirable to provide staggered heating units, or merely reflective surfaces, in the upper unit 12.

Unlike prior art devices, the cooling system of a device of this invention is not integrated with the heating elements. Rather, the cooling system comprises one or more internal longitudinally enclosed cooling chamber. Such a cooling chamber permits airflow along the long axis of the body of the housing. Generally, one or more fan or blower is located at one end of the elongate housing. Air is propelled along the length of the housing through an enclosed chamber. The air is vented at or near the opposite end of the housing. The cooling air current is vented away from the heating elements, so that the air currents do not interfere with the heating process. The cooling air outflow is preferably vented away from the cooling air uptake vent. As shown in FIG. 1, the fans are located at 22. The exhaust vent is shown at 24.

FIG. 12 is a side view of the device of FIG. 11. The upper unit 12 is hinged for easy access to the heating zones. A conveyor system 16 having gripping members 17 is shown. When the conveyor system is a bare conveyor belt, an opposing conveyor belt (not shown) is preferably present. The preferred conveyor system includes a conveyor belt having gripping members which securely hold each workpiece.

A workpiece which is to be heated is loaded into the heater device conveyor system at A. The conveyor system accepts the workpiece, preferably by gripping the workpiece using a gripping member as described above. The workpiece is carried between the opposed heaters of the lower unit 10 and the upper unit 12, shown as B. The workpiece is carried through a cooling area, shown as C, and then released by the conveyor system. The workpiece can be collected, for example at D. The lower unit 10 or the upper unit 12 can be free-standing, in which case the workpiece can be transferred directly to another workstation.

The workpiece can be any desired article which is to be exposed to heat and which can be transported through a device of this invention. For example, the article can be an inner device which is covered by a heat-shrinkable covering. Such articles are commonly electrical connections or splices, covered by a shrinkable tube or a wrap-around cover to provide environmental protection. The device can include an adhesive, particularly a heat-activated adhesive, or it can include solder which is liquified by heat to provide an electrical or mechanical connection.

The dimensions of the workpiece are not critical, and a heater device of this invention can be adapted for most standard workpieces. In general, the workpiece will have a length of from less than 3 inches to 3 feet or greater. The workpiece will have a width and/or height of from less than 1 inch to four inches or greater.

The heater device is easily adapted to thick workpieces, which are not easily handled by devices of the prior art, by providing a greater distance between the lower unit 10 and the upper unit 12. If desired, or for very large workpieces, the upper unit can be suspended independently of the lower unit. Alternatively, only one heater unit, such as the lower unit 10, can be used. When only one heater unit, such as the lower unit 10, is used, it may be desirable to provide a reflective surface on the side of the workpiece opposite the heating unit.

FIG. 13 shows a cross-sectional view of the elongate housing of FIG. 11, taken through line 13—13.

The elongated housing is preferably constructed of extruded aluminum, although other metals (such as brass) can be used. Aluminum is preferred as it has good heat transfer properties, can be easily extruded into complex shapes, provides a light and strong product, and is inexpensive.

The elongate housing can comprise a single unit, but is preferably constructed of multiple subunits. This allows the various subunits to expand and contract at differing rates in response to the heating and cooling of the unit, without causing stress or metal fatigue.

The multiple subunits can be connected through pressure fits, roll pins 5, or screws, for example. As shown, the subunits are extruded, cut to the desired length, and finished. The finished pieces are then assembled by sliding the parts together, and fixing them with roll pins and self-threading screws.

This method of construction has distinct advantages over the prior art. Aluminum shapes can be extruded and cut to any length. A variety of heater devices having, for example, from one to ten or more heating or cooling regions can be manufactured using the same extrusions, merely cut to different lengths for each different design. If desired, a device can be constructed in which only one or two subunits are varied, leaving the rest of the device standard. The aluminum shapes can be worked into a variety of configurations, including internal and/or external heat sinks, as shown. Finally, the aluminum exterior can be finished in a shiny or matte finish, or plated, or by applying paint.

The heating trough 26 is an area of the elongate housing which is recessed, and which includes at least one heating element 58. The heating trough 26 is generally located at the upper surface of a lower (base) unit, and at the lower surface of an upper (opposing) unit. The heating trough 26 preferably includes reflective surfaces and/or reflective materials, so that heat is concentrated at a desired point or region of a passing workpiece. One or more heating trough 26 and heating element 58 provides the heating chamber.

The temperature of the heater can be controlled by placing a temperature sensing element 59 adjacent heating element 58. The temperture can be a thermocouple, for example. The sensor is connected to a control mechanism located in the base unit 14 (see FIG. 11). The control mechanism can be for example a switch that controls solid state relays which turn on the power to the heating element 58.

An upper and a lower heating element 58 are each housed within a heater trough 26. Various heating elements 58 which are appropriate for use herein are well known in the art. Lower-powered heater elements such as those found in the prior art can be used. Heat transfer to the surface of a device of this invention will be minimal when heating elements found in prior art devices are used. However, it is an advantage of this invention that more powerful heaters can be used than were possible with the prior art. A preferred embodiment of this invention uses two sets of paired 1,000 watt heating elements, for a total of 4,000 watts. Heating elements are available from Sylvania or Elstein, for example.

Despite this increase in heating ability, the outer surfaces of the device are maintained at an acceptable working temperature, which is preferably at or near ambient temperature. In general, the temperature of the exposed surfaces of a heater device of this invention does not exceed 60° C. Preferably the temperature is less than 10° C. above ambient temperatures, and is preferably less than 5° C. above ambient temperatures.

Insulation of various types can be present in the heater well. Insulating materials include ceramic insulation, treated glass fiber insulation, and the like. Kevlar™, Nomex™, and Silica, for example, is appropriate. Reflecting surfaces, such as stainless steel with a #8 finish, can be included. Other reflective surfaces include high polish aluminum and gold plating.

The elongated structure includes multiple longitudinal chambers. These chambers are generally consistent for the length of the unit, and do not have openings from one chamber to the next unless openings are designed to aid air flow. These planned openings are generally located at or near the end of the elongate housing.

The most critical characteristic of the housing is the combination of heater trough 26 and the cooling chamber 28. The cooling chamber 28 is adjacent the heating trough 26, but does not interface with the heating trough 26. Air passed through the cooling chamber 28 helps maintain the temperature of the device such that the temperature of the device at its outer surface is at or near the ambient temperature. Air is blown through the cooling chamber 28 by a fan (not shown) located at an end of the cooling chamber. Internal fins 30 act as a heat sink, to aid in the dissipation of heat from the heating element to the air.

The upper unit 12 is made of four subunits: one heater trough piece 32, two upper side pieces 34, and one top piece 36. These pieces function to enclose five channels, as shown. The internally-finned cooling chambers 28 have been described above. A central chamber 38 has notched walls to hold reflective and/or insulator strips 40. Two upper chambers 42 are present. The central chamber 38 and upper chambers 42 can act as cooling chambers in addition to, or in conjunction with, the internally-finned cooling chambers 28, or they can house dead air or insulation.

A variety of insulation materials are available commercially. These materials can find use within a device of this invention. Relatively thin insulation materials such as the ceramic paper from Lydall, Inc. can be used in strips along the length of the device. Larger insulation materials such as the ceramic blanket from Cotronics Corp. can be used to substantially fill a longitudinal chamber. The amount and type of insulation material present can vary with the design of the device.

The lower unit 10 is made of eight subunits: one heater trough piece 32, one body support piece 42, two conveyor support pieces 44, two lower side pieces 46, and two base pieces 48. The lower side piece 46 and the base piece 48 can be joined with a fan, if desired (not shown). Two side chambers 52 can house strips of insulation, can provide additional cooling chambers for moving air, or can be dead air space. As shown, the side chambers 52 enclose part of the conveyor system. The conveyor belt 54 can be seen in cross-section.

The various internal chambers 28, 38, 42, 50 and 52 can be completely independent of one another. In such a case, air is taken from one end of the housing and moves through the housing directly to the opposite end. In the embodiment shown, there is preferably some communication between the chambers. An intake fan pushes air from the base end of the unit through the cooling chamber 28, toward the opposite end of the elongate housing. The air is vented by way of an aperture through the side chamber 52 and past the external fins 56. The air path thus includes a 90° angle before it is vented. An air vent can be manufactured by reverse machining the extruded aluminum casting. This leaves the external fins to act as a finger-guard, while permitting air flow outward through the fins.

Air patterns within the elongate housing can be designed to maximize the rate of cooling. For example, air can be vented sequentially through a multiplicity of chambers before it is vented to the outside. The air path can take one or more 180° turn. The cooling chambers can include fins which act as heat sinks. Alternatively, one or more fan can propel air directly from one end of the housing to the opposite end, and the air can be vented in a straight path from the intake. A cooling chamber can include insulation, reflecting surfaces, fins or other structures which function as a heat sink, wiring, apparatus for fan and conveyor systems or other systems, and the like, in addition to air.

The cooling chamber can have a variety of configurations. However, because the heating trough 26 and the cooling chamber 28 are structurally separated, the venting air from the cooling chamber does not adversely affect the heating temperature. Despite this, greater wattage heating elements can be used than were previously possible. The device does not require a cooling cycle. More accurate control of internal temperatures is possible than was possible using a device of the prior art. And because of the greater control, more workpieces can be processed at a higher temperature than was previously possible.

Low-friction skids 60 aid in the motion of a workpiece across the lower surface of the upper unit 12. The low-friction skids 60 reduce wear on the workpiece as it is transported along the heating device. The low-friction skids 60 are made of UHMW polyethylene. This material is available commercially as Ryan Herco. Teflon™ or Tefzel™ can also be used. The low-friction skids act to gently hold the workpiece in a flattened configuration if the workpiece is subject to bowing when held by the conveyor system. The low-friction skids 60, if present, are usually located on the upper surface, as shown; on the lower surface; or on both surfaces. Such low-friction skids 60 can be placed at any surface which is likely to come in contact with a workpiece.

Reflective strips 62 and insulating strips 40 are shown. Means for restraining the reflective strips 62 and insulating strips 40 can be designed as part of the extruded assembly, as shown. Also shown is a wiring restraint 64, which constrains wiring 66 necessary to run the fans, conveyor system, heaters, or other devices, and keeps the interior of the device free of clutter.

FIG. 14 shows some alternate heating patterns which are available using a device of this invention. These patterns are shown graphically in a top view. For simplicity of description, two sequential heating elements are shown. It will be readily understood that one, two, three, or more heating elements can be easily incorporated into a device of this invention. The direction of travel of a workpiece is shown by an arrow.

FIG. 14a shows a standard heating array. Two sequential heating elements at the same temperature are shown.

FIG. 14b shows an alternate heating array. Two sequential heating elements at different temperature are shown. Such an array can be used to gradually heat, or gradually cool, a workpiece.

FIG. 14c shows yet another heating array. Two sequential heating elements at different temperature are shown, with a cooling zone situated between them. The cooling zone can comprise, for example, a region without heating elements, an air curtain, and the like.

FIG. 14d shows another heating array. Two heating elements at different temperature are shown, with a cooling zone situated between them. The heating elements do not traverse the entire heating trough. Instead, each element is located to one side of the heating trough. This configuration is used to heat the two sides of a workpiece to different temperatures. Such a heating pattern is especially useful when one side of a workpiece is more temperature-sensitive than the other.

While the invention has been described in connection with specific embodiments thereof, those skilled in the art will recognize that various modifications are possible within the principles described herein. Such modifications, variations, uses, or adaptations of the invention, including such departures from the present disclosure as come within known or customary practice in the art, fall within the scope and spirit of the invention.

What is claimed is:

1. A conveyance system comprising an endless flexible belt which circulates through at least two arcs, a first of said arcs having a greater radius than a second of said arcs; at least one structurally rigid gripping member attached to the belt, the gripping member having a free end and an anchoring end disposed at opposite ends of the gripping member; a biasing means which biases the gripping member in a closed position; and a pivot attachment located at a medial point on the gripping member between the anchoring end and the free end, wherein the configuration of the biasing means causes the gripping member to be opened as it traverses an arced path and closed against the belt as it traverses a straight path, without interruption in the movement of the path, and wherein a workpiece is loaded as the gripping member traverses the first arc, and offloaded as the gripping member traverses the second arc.

2. A conveyance system comprising an endless flexible belt which circulates through at least two arcs; at least one structurally rigid gripping member attached to the belt, the gripping member having a free end and an anchoring end disposed at opposite ends of the gripping member; a first biasing means which biases the gripping member in a closed position; a second biasing means which biases the free end of the gripping member away from the surface of the conveyor belt; and a pivot attachment located at a medial point on the gripping member between the anchoring end and the free end, wherein the configuration of the first and second biasing means causes the gripping member to be opened as it traverses an arced path and closed against the belt as it traverses a straight path, without interruption in the movement of the path.

3. A conveyance system comprising an endless flexible belt which circulates through at least two arcs; at least one structurally rigid gripping member attached to the belt, the gripping member having a free end and an anchoring end disposed at opposite ends of the gripping member wherein a surface of the gripping member is adapted to grip a workpiece and comprises a foam pad or a serrated edge; a biasing means which biases the gripping member in a closed position, and a pivot attachment located at a medial point on the gripping member between the anchoring end and the free end, wherein the configuration of the biasing means causes the gripping member to be opened as it traverses an arced path and closed against the belt as it traverses a straight path, without interruption in the movement of the path.

* * * * *